April 8, 1930.  G. C. COX ET AL  1,753,822
FURNACE FOR REDUCING METALS
Filed Oct. 5, 1926  2 Sheets-Sheet 2

INVENTOR.
George C. Cox, Edna Moore McIntyre,
John G. McIntyre, Malcolm McIntyre,
joint executors of last will and
testament of: Henry K. McIntyre.

BY  Walter W Burns
ATTORNEY.

Patented Apr. 8, 1930

1,753,822

UNITED STATES PATENT OFFICE

GEORGE C. COX, OF RALEIGH, AND HENRY K. McINTYRE, DECEASED, LATE OF RALEIGH, NORTH CAROLINA, BY EDNA MOORE McINTYRE, EXECUTRIX, OF RALEIGH, NORTH CAROLINA; JOHN GARDNER McINTYRE, OF NEW YORK, N. Y.; AND MALCOLM McINTYRE, OF CRANFORD, NEW JERSEY, EXECUTORS

FURNACE FOR REDUCING METALS

Application filed October 5, 1926. Serial No. 139,750.

This invention relates to electric furnaces and particularly to those furnaces using direct electric current for electrolytic action and a separate and independent source of current supply for furnishing a whole or part of the energy for causing the electrolyte to be maintained at the required optimum temperature.

In the electrolytic reduction of metals from their ores in fused electrolytes, there are two conditions which must be met. First, there is a certain electro-motive-force which must be applied between the reducing electrodes in order to bring about the desired reduction. This electro-motive-force varies with the different metals. In addition, there is a second condition—the maintenance of the optimum temperature in the electrolyte, which temperature must be maintained in order to bring about the desired electrolytic action.

In such furnaces as carry out such electrolytic action, a part of the energy supplied goes to reduce the metal from its compound or compounds while another part maintains the desired optimum temperature which the conditions require. There is still another part of the energy supplied which may be used in the electro-chemical reactions at the anode.

In the furnaces in common use to carry out such reduction of metal, as in the well known electric furnace for the reduction of aluminum, the energy for both the electrolytic action and for the maintenance of the optimum temperature is supplied by direct current and through a single set of electrodes. Because of the fact that, for example, it is sometimes desirable to change the electrolytic action by altering the electro-motive-force, without changing the optimum temperature, or to change the optimum temperature without altering the electrolytic action, difficulty is met in controlling the one without causing a corresponding but undesirable change in the other.

This difficulty is more clearly realized when it is remembered that metals have certain temperatures between which reduction of their compounds can be brought about. At the same time, there is a certain required voltage necessary to be maintained to bring about the reduction of the metal or group of metals which it is desired to reduce. A voltage less than that required will cause reduction of one or more metals to cease and a greater voltage will cause undesirable reduction of other metals.

It has been found that under certain conditions, it is possible, with the invention described herein, to produce an electrode efficiency in the reduction of certain metals from their compounds or ores, which efficiency approaches double the theoretically possible cathode efficiency under the given conditions in the furnace.

The primary object of this invention is the provision of an improved electric furnace having direct current for producing electrolytic action and a separate and distinct supply of energy including electric, for maintaining the necessary temperature in the electrolyte to permit the electrolytic action to take place.

Another object of this invention is the provision of an electric furnace having a closed electrolyte chamber, direct current electrodes for supplying electrolytic energy and separate means for supplying heat to the electrolyte for maintaining the optimum temperature, including alternating current means.

Another object of this invention is the provision of an electric furnace having a closed electrolyte chamber and separate and independent sets of electrodes for the supply of current for the electrolytic action and maintenance of the optimum temperature.

Another object of this invention is the provision of an electric furnace having a closed electrolyte chamber and direct current electrodes for conducting electric energy to the electrolyte to bring about electrolysis and separate and independent electrodes for supplying alternating current to the electrolyte to produce the heat necessary to maintain the optimum temperature.

Another and further object of this invention is to provide a furnace and a process for use therein which process may be carried out to produce a very much greater efficiency in the reduction of metals from their ores or compounds than has been heretofore believed possible.

To one skilled in the art, other and further objects of the invention will be apparent from a reading of the specification and claims.

Referring to the drawing wherein has been illustrated a preferred embodiment of this invention, Fig. 1 is a top plan view of one form of our improved furnace showing diagrammatically the electrical connections to the electrodes and the electrode holders.

Similar reference characters refer to the same or similar parts throughout the several views of the drawing.

Figure 1:
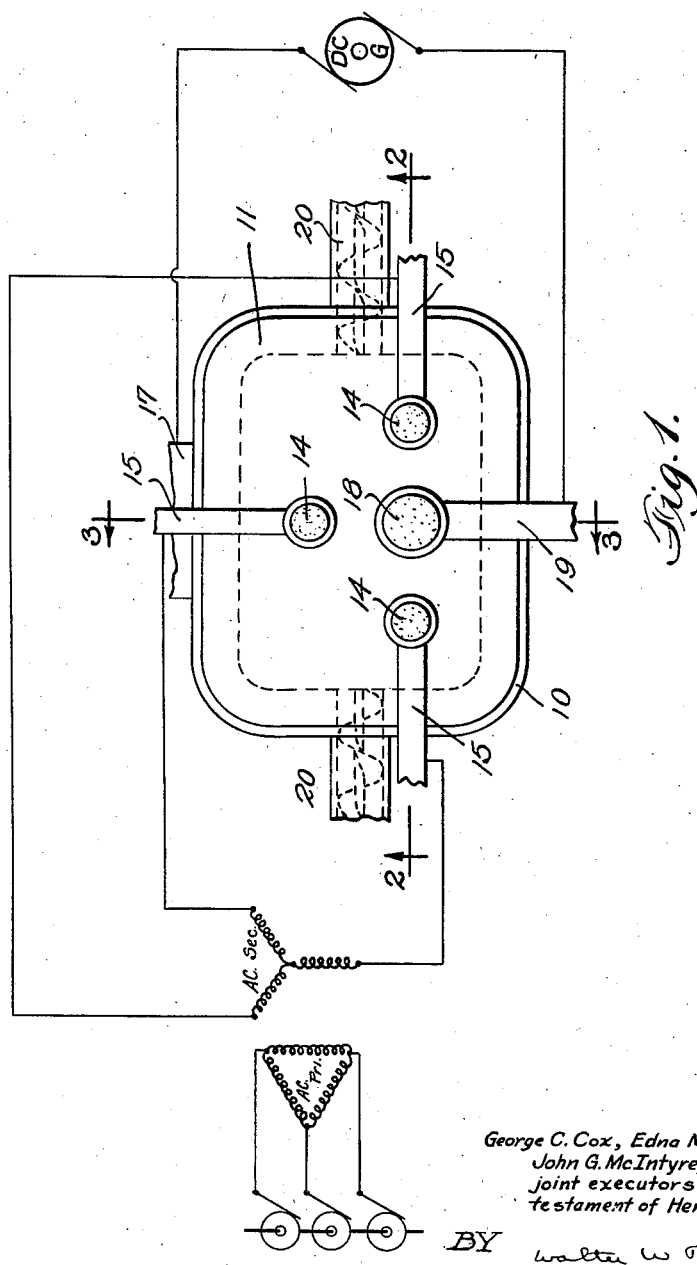
Figure 2:
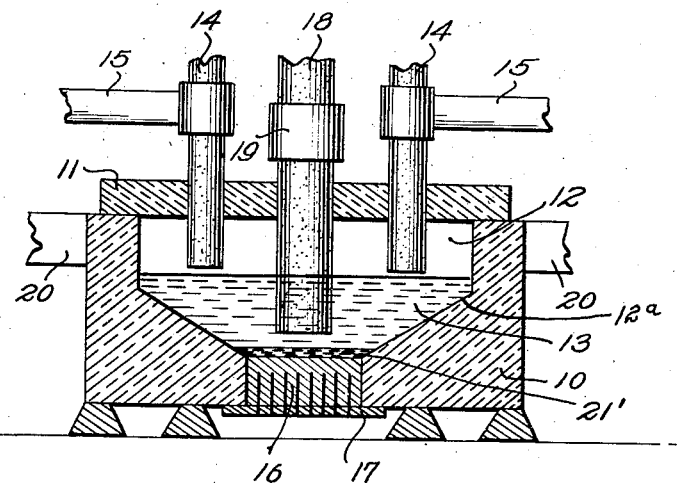
Fig. 2 is a vertical cross sectional view taken on the line 2—2 of Fig. 1.

The main body of the furnace comprises a vessel 10 having a closure member 11. The parts 10 and 11 have a chamber within, which we have designated as 12 and which carries the electrolyte 13.

The electrolyte is maintained at the required optimum temperature by means of a suitable heat supply as by the use of alternating current. The construction illustrated uses the alternating current having the alternating curent electrodes 14 extending through the closure member or cover 11 and held by suitable holders 15 in a manner to be adjustable vertically as is desired. These holders may be adjusted vertically by hand or they may be adjusted automatically as by means of the conventional current-relay motor control electrode hoist mechanism.

The electrolytic current is obtained from any suitable source and is delivered through electrodes to the electrolyte. At the bottom of the furnace is provided the cathode 16 which is connected to a suitable bus bar or lead 17. The anode 18 is located above the cathode 16. The anode 18 passes through an opening in the closure member 11 and is supported in place by a suitable holder 19. The anode may be made of carbon, iron or other suitable material depending upon the metal being reduced and the effect desired at the anode.

In the embodiment herein illustrated, the alternating current electrodes 14 are spaced about the anode 18 and substantially equidistant therefrom, it being intended to use three phase alternating current in this form.

At suitable places as for instance at each side, we have provided ore feeders as at 20. These may be the conventional screw feed charging machine or of any suitable type.

In order to conserve the by-products in the furnace gas and to control the pressure in the interior of the furnace, there is provided a gas vent 21 to which is connected a suitable blower mechanism 21ᵃ. By providing the closure member 11, and the vent 21, we also prevent reactions between the atmosphere, electrodes and furnace gases which would otherwise occur.

The arrangement of the feeders should preferably be such as to deliver the ore to a point or to points where the ore will come in contact with the alternating current arcs in a manner to make the fusing action most efficient.

A form of furnace found to be desirable is one which has the greater portion of its bottom sloping toward the lowest portion, which is at one side and in which is located the cathode. The alternating current electrodes are spaced about the anode and in the form shown, two of the electrodes are on opposite sides of the anode, all of the alternating current electrodes being above the sloping portion. In the form shown, the alternating current electrodes, except during the starting of the heating operation, are maintained so as to be slightly above the surface of the electrolyte, thereby maintaining an arc between each electrode and the electrolyte. In this way the arc causes an intense heat at the surface of the electrolyte and additional heat is supplied by the passage of the current between the electrodes and within the body of the electrolyte.

The operation of this invention will now be described as may be carried out, in the reduction of iron from iron oxide.

Ore, either coarsely crushed or finely divided particles as crushed hematite ore, is charged into the furnace through the feeders 20.

Figure 3:
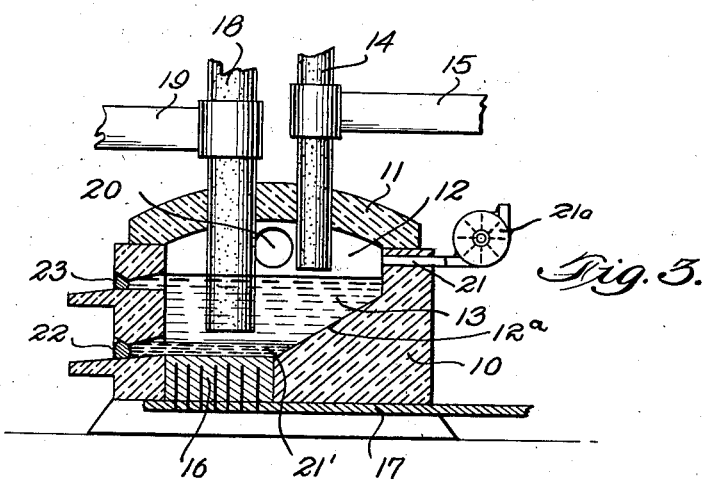
Fig. 3 is a vertical cross sectional view taken on the line 3—3 of Fig. 1.

In regular operation, the charge is first fused by the alternating current, the current being adjusted to produce the desired optimum temperature, at which temperature, the direct current is turned on and electrolysis takes place. The bottom of the furnace is so shaped that the metal which is deposited at the cathode will form a conductor. The metal so deposited as at 21′ may be drawn off at 22. The slag is drawn off through an opening as at 23, Fig. 3.

The height of the anode above the cathode and the voltage between the two are regulated to bring about the reduction of the metal or group of metals which it is desired to have reduced. The height of the alternating current electrodes above the electrolyte is controlled to bring about the desired optimum temperature for the particular ore or compound used in the electrolyte.

In treating certain ores as in the case of iron oxide ore, now being considered, it has been found that a process may be carried out with this furnace which process will produce much more reduced metal for a given input at the electrolytic electrodes, than would be expected. It will be endeavored hereinafter to explain what takes place under these conditions.

When using this process, the anode 18 is made of carbon or graphite, the charge is hematite.

After the furnace is started by any of the customary or suitable methods, the fused electrolyte is brought to a temperature of about 1500 C. At this temperature the electrolyte will remain in a fused condition. The anode is lowered into the electrolyte and the electrolytic current turned on, the voltage being kept as nearly constant as possible at four and one-half volts.

The iron deposited on the cathode has been found to be much greater in amount than it was believed could be theoretically deposited for the input used. It appears then that the independent regulation of the electrolytic current and the separate and independent and constant control of the optimum temperature causes the breaking up of the hematite into iron which is deposited at the cathode by cathode reduction and the liberation of nascent oxygen at the anode which immediately combines with the carbon of the anode giving carbon monoxide. This carbon monoxide reacts with more hematite causing a further reduction and a liberation of carbon dioxide. It was found that this process in this furnace produced an actual efficiency in metal reduced of as great as 125% in the case of the iron ore and 190% in the case of the reduction of copper from malachite.

It is thus seen that a process has been produced wherein an element is liberated at the anode to combine with an element of the electrolyte to cause further reduction of the metal in addition to that reduced by cathode reduction.

While this specification and drawing describe and illustrate one from of the furnace and process in detail it is desired that it be understood that the invention is not confined to the exact details set forth and shown, but that modifications and changes may be made without departing from the spirit of the invention and within the scope of the appended claims.

Having described this invention what is claimed is:—

1. An electric furnace comprising a closed electrolyte chamber, the bottom portion of the chamber sloping toward a low portion, a cathode at the bottom of the low portion, an anode located above the cathode, the cathode and anode being the direct current electrolytic electrodes, alternating current electrodes for supplying current energy to provide heat for maintaining the electrolyte at the optimum temperature and having their inner ends over the sloping portions, the alternating current and direct current electrodes being separate and distinct from each other.

2. An electric furnace comprising a closed electrolyte chamber, a cathode at one side of the chamber at the lowest point thereof, the greater portion of the remainder of the bottom of the chamber sloping toward the cathode, an anode located substantially above the cathode and with the cathode furnishing the means for delivery of the electrolytic current to the electrolyte, alternating current electrodes spaced about the anode and over the sloping portion of the chamber bottom, means for feeding the ore to the chamber in a line with the space between two alternating current electrodes.

In testimony whereof we hereunto affix our signatures.

GEORGE C. COX.
EDNA MOORE McINTYRE,
*Joint Executrix of the Last Will and Testament of Henry K. McIntyre, Deceased.*
JOHN GARDNER McINTYRE,
*Joint Executor of the Last Will and Testament of Henry K. McIntyre, Deceased.*
MALCOLM McINTYRE,
*Joint Executor of the Last Will and Testament of Henry K. McIntyre, Deceased.*